(12) United States Patent
La Fetra et al.

(10) Patent No.: US 7,271,613 B1
(45) Date of Patent: Sep. 18, 2007

(54) METHOD AND APPARATUS FOR SHARING AN INPUT/OUTPUT TERMINAL BY MULTIPLE COMPENSATION CIRCUITS

(75) Inventors: Ross Voigt La Fetra, Sunnyvale, CA (US); Rohit Kumar, San Jose, CA (US); Sai V. Vishwanthaiah, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 38 days.

(21) Appl. No.: 11/070,347

(22) Filed: Mar. 2, 2005

(51) Int. Cl.
*H03R 19/0185* (2006.01)

(52) U.S. Cl. ............... 326/30; 326/86; 365/189.05; 323/272

(58) Field of Classification Search .......... 327/112, 327/108, 379, 380; 307/270, 443; 326/30, 326/27, 85, 26, 83, 86–87, 57, 63, 68; 365/189.05, 365/230.06; 323/312–317
See application file for complete search history.

(56) References Cited

U.S. PATENT DOCUMENTS

| | | | | |
|---|---|---|---|---|
| 5,805,505 | A * | 9/1998 | Zheng et al. | 365/189.05 |
| 6,249,153 | B1 * | 6/2001 | Moraveji | 327/65 |
| 6,265,859 | B1 * | 7/2001 | Datar et al. | 323/315 |
| 6,424,131 | B1 * | 7/2002 | Yamamoto et al. | 323/282 |
| 6,483,793 | B1 * | 11/2002 | Kim | 369/59.22 |
| 6,812,732 | B1 * | 11/2004 | Bui | 326/30 |
| 6,979,984 | B2 * | 12/2005 | Perrier et al. | 323/281 |

* cited by examiner

*Primary Examiner*—Rajnikant B. Patel
(74) *Attorney, Agent, or Firm*—Zagorin O'Brien Graham LLP

(57) ABSTRACT

An integrated circuit includes at least a first and second compensation circuit that compensate for process, temperature, and other variable conditions that affect circuit performance. A compensation select circuit is coupled to selectively enable each of the first and second compensation circuits at respective first and second time periods to control a voltage on the input/output terminal to substantially equal a reference voltage and thereby determine appropriate compensation setting.

25 Claims, 2 Drawing Sheets

METHOD AND APPARATUS FOR SHARING AN INPUT/OUTPUT TERMINAL BY MULTIPLE COMPENSATION CIRCUITS

BACKGROUND

1. Field of the Invention

This application relates to compensation circuits utilized on integrated circuits.

2. Description of the Related Art

Compensation circuits compensate for process, temperature, and other variable conditions that affect circuit performance. Compensation circuits typically work by measuring the circuit's performance against a known reference parameter such as voltage or current. A typical compensation circuit 10 is shown in FIG. 1 in which a known reference voltage is supplied on node 11. An input/output terminal 13 is coupled to a power supply node (VDD) through external resistor 15. Comparator 17 compares the voltage present on I/O terminal 13 with the reference voltage supplied on node 11. The compensation circuit adjusts the voltage on I/O terminal 13 by selectively enabling field effect transistors (FETs) 12, 14, and 16 to be substantially equal to the reference voltage supplied on node 11. Note that although three FETs 12, 14, and 16 are shown, the number of FETs utilized in a typical compensation circuit is much higher.

Often multiple compensation circuits are required to account for differences in circuit design types and locations. However, in current compensation schemes, the I/O terminal and external resistor 15 are dedicated to a single compensation circuit precluding the I/O terminal and the resistor from being shared among multiple compensation circuits. As die size and complexity increase, the number of compensation circuits also tends to increase. An increasing number of external resistors requiring separate I/O terminals places a burden on the package, especially if the pins in a particular design are fixed due to compatibility requirements with earlier designs. It would be desirable to find an improved compensation approach that reduces the pin and resistor cost associated with the increasing need for compensation circuits.

SUMMARY

Accordingly, the invention allows two or more compensation circuits to share a single I/O terminal and resistor. Only one of the compensation circuits is enabled at a time. The enabled compensation circuit can then determine appropriate compensation values while the disabled compensation circuit minimally affects the compensation determination.

In one embodiment, a method is provided that includes selectively enabling each of a first and a second compensation circuit during respective first and second time periods to control a voltage on an input/output terminal of an integrated circuit to be substantially equal to a first and second reference voltage respectively supplied to the first and second compensation circuits. A first power supply node is coupled through an external resistor to the input/output terminal. During the first time period a comparator compares the voltage on the input/output terminal to the first reference voltage and compensates the voltage on the input/output terminal by selectively enabling various ones of a first plurality of transistors of the first compensation circuit according to the comparison. During the second time period a comparator in the second compensation circuit compares the voltage on the input/output terminal to the second reference voltage and compensates the voltage on the input/ output terminal by selectively enabling a second plurality of transistors of the second compensation circuit according to the comparison.

In another embodiment an integrated circuit includes a first and a second compensation circuit coupled to an input/output terminal of the integrated circuit and to a reference voltage. A control circuit is coupled to selectively enable each of the first and second compensation circuits at respective first and second time periods to control a voltage on the input/output terminal to be substantially equal to, respectively, the first and second reference voltages.

In another embodiment, a method is provided that includes enabling a first compensation circuit during a first period, while a second compensation circuit is disabled, to compare a reference voltage to a voltage present on an input/output terminal of an integrated circuit and to adjust operation of the first compensation circuit in response to the comparison; and enabling a second compensation circuit during a second time period, while the first compensation circuit is disabled, to compare a reference voltage to a voltage on the input/output terminal and to adjust operation of the second compensation circuit in response to the comparison. The method may further include the first compensation circuit performing the adjusting operation by selectively enabling transistors coupling the input/output terminal to a power supply node to cause the reference voltage and the voltage on the input/output terminal to be substantially the same.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
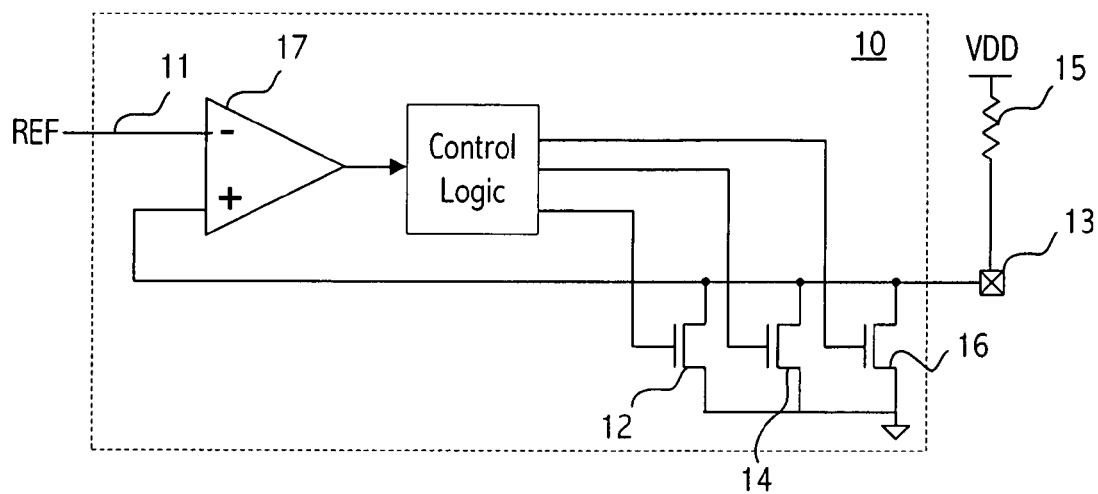
FIG. 1 is a prior art compensation circuit.
Figure 2:
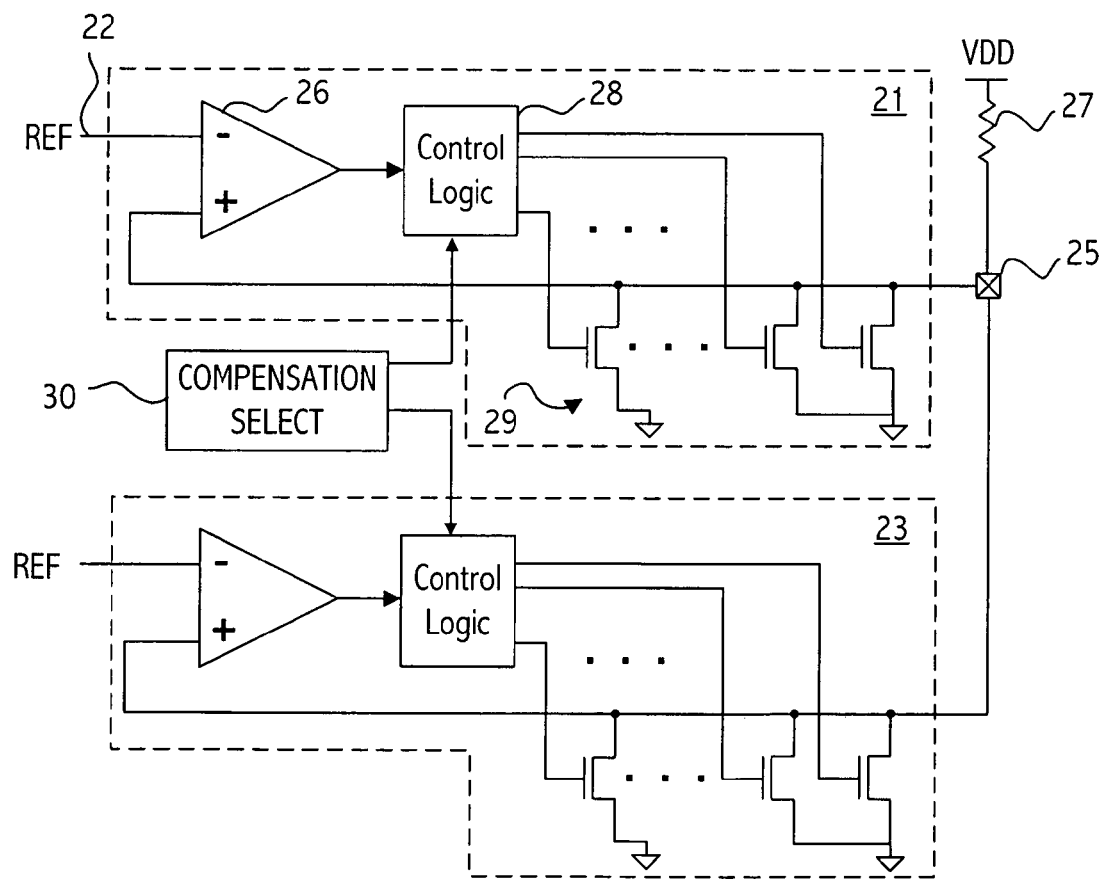
FIG. 2 is an exemplary embodiment of N-channel compensation circuits utilized to determine the appropriate compensation for the pull-down portion of an output driver according to an embodiment of the invention.

Referring to FIG. 2, an example of compensation circuits according to an embodiment of the present invention is illustrated. The embodiment illustrated in FIG. 2 shows two compensation circuits 21 and 23 sharing the same I/O terminal 25 and external resistor 27. The compensation circuits 21 and 23 work in a similar manner. The operation of compensation circuit 21 will be described. The comparator 26 compares the reference voltage REF supplied on node 22 with the voltage present on I/O terminal 25. The reference voltage may be supplied, e.g., from a voltage divider network external to the integrated circuit. The control logic 28 utilizes the results of the comparison to control the legs (FETs 29) of the compensation circuit. When the voltage at the I/O terminal 25 is above the reference voltage on node 22, the control logic 28 turns on additional legs (FETs 29). That decreases the resistance of the FET portion of the circuit thereby decreasing the voltage present at the I/O terminal 25. When the voltage reference at the I/O terminal 25 is below the reference voltage on node 22, the control logic 28 turns off additional legs (FETs 29) to increase the resistance provided by the FETs and cause the voltage at I/O terminal 25 to be increased. In that way the compensation circuit compensates automatically for variations in FET operation due to such factors as process and temperature variations. In addition, the compensation circuit compensates for variations in the DC supply voltage. In some applications the DC supply voltage can vary significantly, e.g., by 200 mV or more.

The compensation settings for the FETs that cause the voltage on the I/O terminal 25 to substantially equal the reference voltage REF on node 22 are utilized by other I/O circuits to compensate for variations in such factors as process and temperature. That is, the approach described herein uses replica circuits in which a copy (or replica) of the actual I/O circuit (e.g. the output driver) is utilized for the compensation circuit. The compensation values determined in the replica circuit are used by one or more I/O circuits. The output terminal is shared by multiple compensation or replica circuits. While one compensation circuit is off, its previously determined compensation values are being supplied to the one or more I/O circuits that utilize the compensation values. While not shown explicitly in FIG. 2, the control logic 28 stores the compensation setting in a register or other suitable storage. Note that the compensation circuits may receive the same reference voltage REF or different reference voltages.

Note that a large number of FETs are typically used for the legs of the compensation circuit. The FETS are typically small and each FET provides a relatively small change in the voltage on I/O terminal 25 as it is turned on or off. Note that because the resistor 27 is external, a high precision resistor, e.g., 1% can be used, as opposed to much less precise resistors that can typically be implemented on chip.

Compensation circuit 23 operates in a similar manner to compensation circuit 21. That is, compensation circuit 23 determines the appropriate resistance of the output driver (by controlling the number of legs turned on) to control the current (set by external resistor 27) delivered at a particular voltage (specified by the reference voltage REF). However, simultaneous operation of compensation circuits interfere with determination of the compensation settings. Therefore, a compensation select circuit 30 is utilized to selectively enable the compensation circuits 21 and 23. In that way the compensation circuits are not on at the same time thereby allowing each compensation circuit to determine an appropriate compensation value while the other compensation circuit is off. When a compensation circuit is turned off, for example compensation circuit 21, all of its FETs 29 are turned off by control logic 28 so as not to affect or minimally affect the voltage present on I/O terminal 25. In addition the current compensation setting of the compensation circuit to be disabled is frozen with the current compensation value prior to being disabled. That frozen value is provided to the I/O drivers using that compensation value while the compensation circuit is disabled.

When the compensation circuit is enabled again, comparator 26 again compares the reference voltage supplied on node 22 to the voltage present on I/O terminal 25 and adjusts the number of legs (FETs) that are turned on to cause the voltages to match. That updated setting is then provided to all output drivers using this compensation circuit. Note that the compensation circuits shown in FIG. 2 are N-channel pull down compensation circuits that determine the appropriate strength for an output driver when a zero is being driven. That ensures that the output drivers have a similar strength to that of the compensation circuit.

Note that the compensation circuit does not have to be on all the time in order to adequately compensate for variations in temperature, process, etc. That allows compensation select circuit select 30 to enable one compensation circuit while the other compensation circuit is off. The compensation select circuit 30 can control the compensation circuits 21 and 23 by periodically turning on each of them at different times. For example, one or more counters may be utilized to enable the compensation circuits periodically. The period may be on the order of milliseconds. Other time periods may of course be utilized. The compensation selector should ensure that one compensation circuit has been off a sufficient length of time before enabling the other compensation circuit so as not to interfere with its compensation determination. The amount of time that a compensation circuit has to be on is significantly less that the amount of time it may be off. The compensation circuit may operate as fast as the I/O circuit is expected to operate, e.g., in the nanosecond time frame. But there is typically no need to make the compensation settings change quickly, so, at least in some embodiments, the compensation control circuit operates much more slowly, e.g., on the order of a microsecond or even more slowly. Other embodiments may utilize faster compensation schemes. Note that once the initial compensation is done, there is usually little reason to change quickly, so even very slow updates (e.g., on the order of a millisecond) will work. The need for compensation speed is determined by the factors that affect the driver strength and how fast those factors can change. Process variation is often the major contributor to variations in driver strength, and for a particular semiconductor device, that never changes.

While two compensation circuits have been shown, more than two compensation circuits may be supported by a single I/O terminal and external resistor. However, the number of compensation circuits supported by a single I/O terminal and external resistor may be limited by the leakage current and capacitive load placed on the I/O terminal by having additional devices coupled to the I/O terminal. The number of compensation circuits supported by a single I/O terminal will depend upon the design requirements for a particular system. Regardless of the number of compensation circuits sharing an input/output terminal, only one of the compensation circuits should be enabled at any one time.

Note that a very low resistance connection should be available to connect spatially distributed compensation elements, where the resistance value of the very low resistance<<precision resistor. That ensures that the additional error term introduced by the resistance is kept small.

Figure 3:
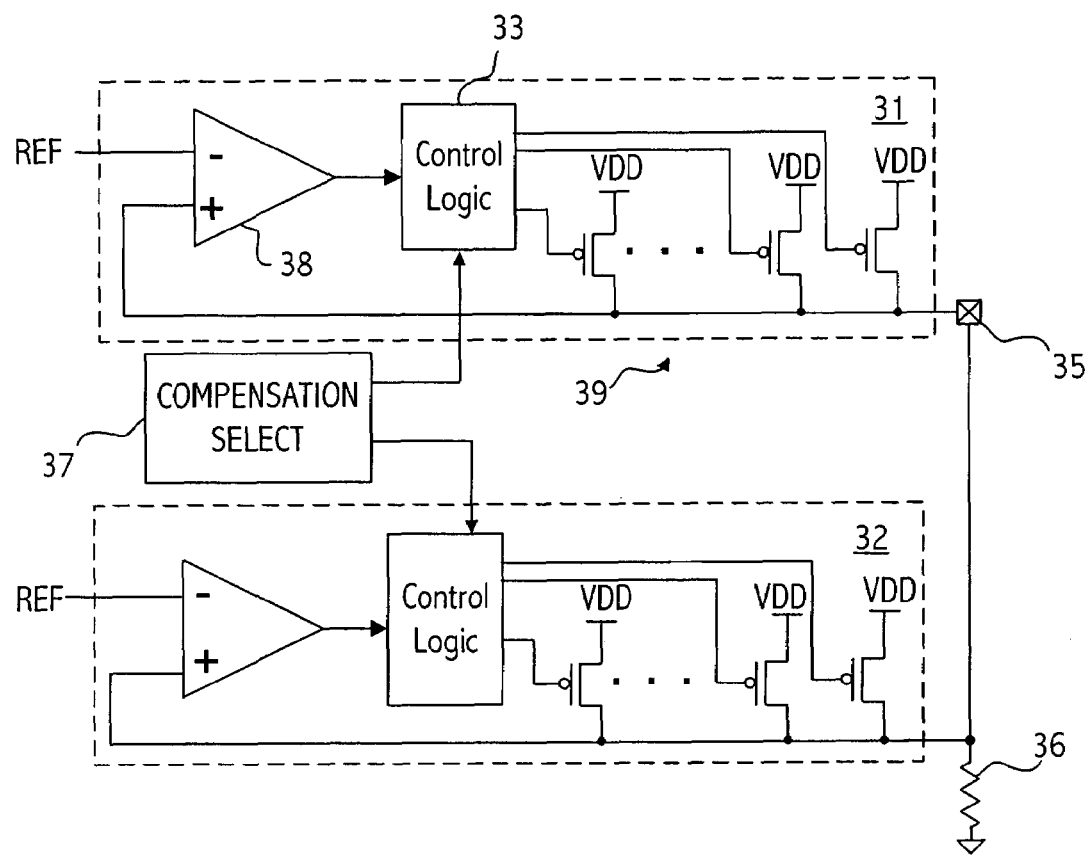
FIG. 3 is an exemplary embodiment of P-channel compensation circuits utilized to determine the appropriate compensation for the pull-up portion of an output driver according to an embodiment of the invention.

While FIG. 2 illustrates compensation circuits suitable for determining the strength of an output driver when a zero is being driven, FIG. 3 illustrates multiple compensation circuits coupled to a single I/O terminal 35 and external resistor 36 that are suitable for determining the strength of output drivers if a one is being driven. As shown in FIG. 3, a compensation select circuit 37 selectively enables compensation circuits 31 and 32 at different times to compare the voltage present on I/O terminal 35 to a reference voltage REF in comparator 38. In response to the comparison, compensation control logic 33 turns on the appropriate number of transistors 39 to cause the voltage on I/O terminal 35 to be substantially equal to the reference voltage REF. Compensation circuit 32 operates in a similar manner. Because the compensation circuits are controlled to be enabled at different times, they can share the same I/O terminal and external resistor.

The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method comprising:
   selectively enabling each of a first compensation circuit and a second compensation circuit during respective first and second time periods to control a voltage on a shared input/output terminal of an integrated circuit to be substantially equal to a first and second reference voltage respectively utilized by the first and second compensation circuits.

2. The method as recited in claim 1 further comprising selectively enabling at least a third compensation circuit during a third time period to control a voltage on the shared input/output terminal of the integrated circuit to be substantially equal to a third reference voltage utilized by the third compensation circuit.

3. The method as recited in claim 2 wherein only one compensation circuit is enabled at a time.

4. The method as recited in claim 1 further comprising coupling a first power supply node through an external resistor to the input/output terminal.

5. The method as recited in claim 1 further comprising:
   during the first time period comparing the voltage on the input/output terminal to the first reference voltage and compensating the voltage on the input/output terminal using a first plurality of transistors of the first compensation circuit according to the comparison; and
   during the second time period comparing the voltage on the input/output terminal to the second reference voltage and compensating the voltage on the input/output terminal using a second plurality of transistors of the second compensation circuit according to the comparison.

6. The method as recited in claim 1 further comprising periodically enabling the first and second compensation circuits.

7. The method as recited in claim 1 further comprising turning off a first plurality of transistors of the first compensation circuit during the second time period while the second compensation circuit is enabled and turning off a second plurality of transistors of the second compensation circuit during the first time period while the first compensation circuit is enabled.

8. The method as recited in claim 1 wherein the first and second reference voltages are the same reference voltage.

9. An integrated circuit comprising:
   a first and a second compensation circuit coupled to a shared input/output terminal of the integrated circuit and coupled to utilize respectively a first and second reference voltage; and
   a selector control circuit coupled to selectively enable each of the first and second compensation circuits at respective first and second time periods to control a voltage on the shared input/output terminal to be substantially equal to, respectively, the first and second reference voltages.

10. The integrated circuit as recited in claim 9 further comprising:
    one or more additional compensation circuits coupled to the shared input/output terminal, the selector circuit controlling all the compensation circuits such that only one compensation circuit is enabled at any one time to control the voltage on the shared input/output terminal to be substantially equal to a reference voltage utilized by the one compensation circuit that is enabled.

11. The integrated circuit as recited in claim 9 further comprising:
    a first plurality of transistors of the first compensation circuit selectively controlled to adjust the voltage on the input/output terminal during the first time period in accordance with a comparison of the voltage on the input/output terminal to the first reference voltage; and
    a second plurality of transistors of the second compensation circuit selectively controlled to adjust the voltage on the input/output terminal during the second time period in accordance with a comparison of the voltage on the input/output terminal to the second reference voltage.

12. The integrated circuit as recited in claim 9 wherein the first and second compensation circuits are periodically enabled.

13. The integrated circuit as in claim 11 wherein further comprising turning off a first plurality of transistors of the first compensation circuit during the second time period while the second compensation circuit is enabled and turning off a second plurality of transistors of the second compensation circuit during the first time period while the first compensation circuit is enabled.

14. The integrated circuit as in claim 11 wherein the first and second reference voltages are the same reference voltage.

15. A method comprising:
    enabling a first compensation circuit during a first period, while a second compensation circuit is disabled, to compare a reference voltage to a voltage present on an input/output terminal of an integrated circuit and to adjust operation of the first compensation circuit in response to the comparison by selectively enabling transistors coupling the input/output terminal to a power supply node to cause the reference voltage and the voltage on the input/output terminal to be substantially the same and storing compensation settings corresponding thereto in a storage; and
    enabling a second compensation circuit during a second time period, while the first compensation circuit is disabled, to compare a reference voltage to a voltage on the input/output terminal and to adjust operation of the second compensation circuit in response to the comparison.

16. The method as recited in claim 15 further comprising coupling a first power supply node through an external resistor to the input/output terminal.

17. The method as recited in claim 15 further comprising periodically enabling the first and second compensation circuits using one or more counters.

18. The method as recited in claim 15 further comprising turning off a first plurality of transistors in the first compensation circuit coupling the input/output terminal to a power supply node during the second time period while the second compensation circuit is enabled and turning off a second plurality of transistors of the second compensation circuit during the first time period while the first compensation circuit is enabled.

19. An apparatus comprising:
    an integrated circuit including,
    a plurality of compensation circuits coupled to vary respective resistances of the compensation circuits to thereby control a current received from an external source through a terminal of the integrated circuit, the current being supplied at a voltage determined by one or more reference voltages respectively supplied to the compensation circuits;

a compensation select circuit coupled to selectively enable each of the compensation circuits to control the current through the terminal at different times; and a storage to store compensation values for the compensation circuits.

20. The apparatus as recited in claim 1 further comprising a resistor, external to the integrated circuit coupled to the input/output terminal, the resistor being coupled to a supply voltage.

21. A method comprising:

during a first time period enabling a first compensation circuit to determine first compensation settings to control a voltage on a terminal of an integrated circuit to be substantially equal to a first reference voltage;

storing the first compensation settings in a storage;

during a second time period while the first compensation circuit is disabled, enabling a second compensation circuit to determine second compensation settings to control the voltage on the terminal of the integrated circuit to be substantially equal to a second reference voltage; and during the second time period, supplying the first compensation settings to one or more output drivers driving one or more output terminals.

22. The method as recited in claim 1 further comprising storing compensation settings used to control the voltage in a storage.

23. The method as recited in claim 1 further comprising supplying the compensation settings determined by one of the first and second compensation settings to one or more input/output circuits while the one of the first and second compensation circuits is off.

24. The method as recited in claim 15 further comprising supplying the stored compensation settings while the first compensation circuit is off to one or more output drivers.

25. The apparatus as recited in claim 9 further comprising storage to store compensation values to control the voltage on the shared input/output terminal to be substantially equal to the first and second reference voltages.

* * * * *